US011067458B2

United States Patent
Ohodnicki et al.

(10) Patent No.: US 11,067,458 B2
(45) Date of Patent: Jul. 20, 2021

(54) DISTRIBUTED SENSING OF ELECTROMAGNETIC COMPONENTS USING OPTICAL FIBER BASED METHODS

(71) Applicant: Carnegie Mellon University, Pittsburgh, PA (US)

(72) Inventors: Paul Ohodnicki, Pittsburgh, PA (US); Michael McHenry, Pittsburgh, PA (US); Alex Leary, Pittsburgh, PA (US); Richard Beddingfield, Raleigh, NC (US); Michael Buric, Morgantown, WV (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 191 days.

(21) Appl. No.: 16/123,786

(22) Filed: Sep. 6, 2018

(65) Prior Publication Data

US 2019/0072437 A1    Mar. 7, 2019

Related U.S. Application Data

(60) Provisional application No. 62/606,160, filed on Sep. 6, 2017, provisional application No. 62/606,015, filed on Sep. 6, 2017.

(51) Int. Cl.
*G01K 11/32* (2021.01)
*H01F 27/40* (2006.01)
*G01L 1/24* (2006.01)
*G01K 11/324* (2021.01)

(52) U.S. Cl.
CPC ............. *G01K 11/32* (2013.01); *G01L 1/242* (2013.01); *H01F 27/402* (2013.01); *G01K 11/324* (2021.01); *H01F 2027/406* (2013.01)

(58) Field of Classification Search
None
See application file for complete search history.

(56) References Cited

U.S. PATENT DOCUMENTS

| | | | | | |
|---|---|---|---|---|---|
| 5,356,220 | A | * | 10/1994 | Iida | C21B 7/24 374/161 |
| 6,811,307 | B2 | * | 11/2004 | Crowe | G01K 11/32 250/227.14 |
| 7,154,081 | B1 | * | 12/2006 | Friedersdorf | G01B 11/18 250/227.14 |
| 8,636,408 | B2 | * | 1/2014 | Kasajima | G01K 15/00 374/161 |
| 2015/0300891 | A1 | * | 10/2015 | Mitchell | E21B 47/135 356/73.1 |
| 2018/0058956 | A1 | * | 3/2018 | Molin | G01D 5/35306 |

* cited by examiner

*Primary Examiner* — Edwin C Gunberg
(74) *Attorney, Agent, or Firm* — Kacvinsky Daisak Bluni PLLC (57) ABSTRACT

An OFDR based fiber-optics sensor for distributed real-time temperature rise monitoring of a transformer in operation has been disclosed. The fiber-optic sensor provides an effective solution to monitoring the physical structures of the transformer core, as well as accurately detecting the non-uniform temperature distribution inside the transformer, and thus provides innovative feedback to the transformer design by minimizing the core losses. Additionally, the method may be responsive to the presence of magnetic and electric fields, as well as responsive to various chemical species. The method allows novel approaches to real-time asset monitoring of power transformers while operational.

17 Claims, 11 Drawing Sheets

DISTRIBUTED SENSING OF ELECTROMAGNETIC COMPONENTS USING OPTICAL FIBER BASED METHODS

RELATED APPLICATIONS

This application claims the benefit of U.S. Provisional Applications Nos. 62/606,160, filed Sep. 6, 2017 and 62/606,015, filed Sep. 6, 2017.

GOVERNMENT INTEREST

This invention was made with government support under DOE No. DE-EE0007464 awarded by the Department of Energy. The government has certain rights in the invention.

BACKGROUND OF THE INVENTION

Monitoring of temperatures and other critical parameters for operational power magnetics components is problematic due to a combination of high voltages and currents, electromagnetic interference, elevated temperatures and insulation oils/gases, and the potential for electrical based sensing methodologies to interfere with the operation of the energized component. Thermal management of passive components such as inductors and capacitors Is a key challenge for successful power conversion at high efficiency and reliability, as the emergence of new SIC- and GaN-based wide bandgap semiconductor devices enables higher temperature and frequency operation to achieve new and unprecedented power densities. In addition, large power transformers are critical grid assets for which catastrophic failures can have major social and economic impacts. Internal component monitoring of key parameters Including temperature, gas phase or Insulation oil chemistry, acoustic emissions, electric, and magnetic fields can allow for identification of faults prior to catastrophic failures and can save significant time and resources by enabling condition-based maintenance programs.

Power transformers are a critical electrical grid asset for which catastrophic failures can represent significant direct economic, opportunity, and even safety costs. Due to a high degree of customization, dominance of foreign owned power transformer manufacturers, and anticipated lifetimes of greater than 30 years for large power transformers, there is a major need for improved instrumentation of transformer lifetime to enable real-time diagnostics of transformer operational conditions which are signatures of potential fault conditions prior to the initiation of catastrophic failures.

SUMMARY OF THE INVENTION

The invention describes a technology for which internal temperature within a power transformer can be measured in real time as a function of time and spatial position throughout the component. For example, the sensor can be applied to the insulation oil, the outer casing, and even directly to the electrical windings and magnetic core during high power and high voltage operation or embedded within the laminations of a magnetic core to determine internal core temperatures, information which cannot be obtained in any other way using standard temperature measurement tools and techniques. The sensor element is comprised of low-cost, commercially available materials and is combined with advanced interrogation and sensor application methodologies. The same sensing technology can also be applied to other power magnetics components including inductors and rotating electrical machinery such as motors. The sensor platform can also be extended to other parameters of interest including chemistry of insulation oils or gases, magnetic fields, and voltages through functionalization with selected thin film materials systems.

The dimensions of the compact transformer create a challenge for conventional sensing methods to access with only discrete measurement points at selected locations being possible, if at all, with conventional technologies. Because distributed interrogation methods combined with optical sensing fibers have the advantages of small size and high flexibility, it is possible to install the sensing fiber distributed over the whole core structures without affecting the precise effective temperature readings or negatively impacting the operation of the magnetic core structure. Additionally, the dynamic temperature rising process can be effectively monitored by the optical fiber sensor which provides valuable time dependent information in conjunction with spatially distributed information.

Rayleigh backscatter in optical fiber is caused by random fluctuations in the refractive index profile along the fiber length, and it varies randomly along the fiber length due to inhomogeneity of the fiber. Changes in the refractive index profile caused by an external stimulus such as temperature will induce a spectral shift in the measured signal derived from a cross-correlation of the backscattered intensity under two different measurement conditions which can be measured by an optical frequency-domain reflectometer (OFDR) system. A high-sensitivity, high-resolution OFDR system can be used to measure distributed temperature rise of a compact transformer core.

DETAILED DESCRIPTION

Optical backscattering-based reflectometry techniques such as optical time domain (OTDR) and optical frequency domain reflectometry (OFDR) enable the distributed Interrogation of physical parameters such as temperature and strain along the length of low-cost, commercial optical fibers with millimeter to centimeter resolution depending upon the detailed interrogation system. The current invention is comprised of the application of optical fiber-based sensors to power magnetics components including transformers, inductors, and rotating electrical machinery such as motors and generators. More specifically, the 2d and 3d temperature profiles throughout the component, including along the surface and within the interior of a magnetic component such as a magnetic core, can be mapped by maintaining thermal contact of an optical fiber along the component. Similarly, the strain distribution can also be obtained through maintaining mechanical contact. Through functionalization of the optical fiber platform with thin or thick film sensing materials, the platform can also be functionalized for sensing other parameters of interest for asset monitoring in such components including, for example, magnetic field, electric field, and gas phase/insulation oil chemistry thereby allowing for spatially resolved measurements of these important parameters.

As one example, for fiber-optics sensing based distributed temperature measurement of a single-phase two-winding transformer, the technique is applied to a core comprised of a FINEMET-type ribbon approximately 50.8 mm wide and 20 µm thick. The ribbon is wound into a toroid core and then formed into a racetrack shape using a steel fixture. After forming a tape wound core from the nanocrystalline ribbon, the assembly (material and steel fixture) is annealed at 540° C. for 3 hours in air. Finally, the core is impregnated with an epoxy resin to provide strength and shape retention. To lessen the impact of fringing flux and other imperfections, the core is left uncut. Each core section has a 3 mm OD nylon served Type 2 Litz wire four-turn winding, insulated with Nomex® and Kapton tape. Wire terminations are made with a ring terminal by crimping and dip soldering. The core is attached to a custom extruded aluminum frame to allow for minimal impacts from strain. The constructed transformer is subjected to an open secondary test using a custom developed H-bridge based bipolar excitation circuit to evaluate its core losses and thermal field distribution when excited with waveforms on the primary winding that are relevant for deployment in medium frequency power electronics and power conversion applications.

The custom excitation circuit employs SiC-based semiconductor JFET devices and is rated for excitation voltages approaching 800V with a DC power supply rated for up to 15 kW. When considering the high anticipated efficiencies of transformer cores, which are typically targeted at 98% or greater, the system can in principle allow for excitations that are relevant for cores utilized in power converter applications at 50-100 kW or even greater. For the purpose of demonstration of the application of optical fiber distributed sensor technology to transformer monitoring in this work, described herein is a setup using a small prototype transformer core at low to moderate excitation conditions with sufficient losses to result in measurable temperature profiles that can be detected and quantified. Similar methodologies can be applied to larger magnetic cores under higher power excitation conditions and the results can be compared with thermal models to allow for new tools to optimize the design of advanced magnetic core technologies for a range of power electronics and transformer applications.

In one embodiment, a magnetic core testing system comprises a magnetic core test fixture; an H-bridge based switching circuit for arbitrary waveform excitation; a DC power supply up to 1500V and 30 A; and primary coils for exciting the core along with an open secondary for core response measurement.

The FINEMET-based magnetic core described above was used to show the viability of the method. A LUNA optical backscatter interferometry (OFDR) system was used in conjunction with Corning SMF28 single mode-based optical fiber to perform the distributed temperature measurement under core excitation of a 100V, 50 kHz square wave with a 50% duty cycle. The instrumented optical fibers are placed in contact with the core using a thermal paste.

Figure 1:
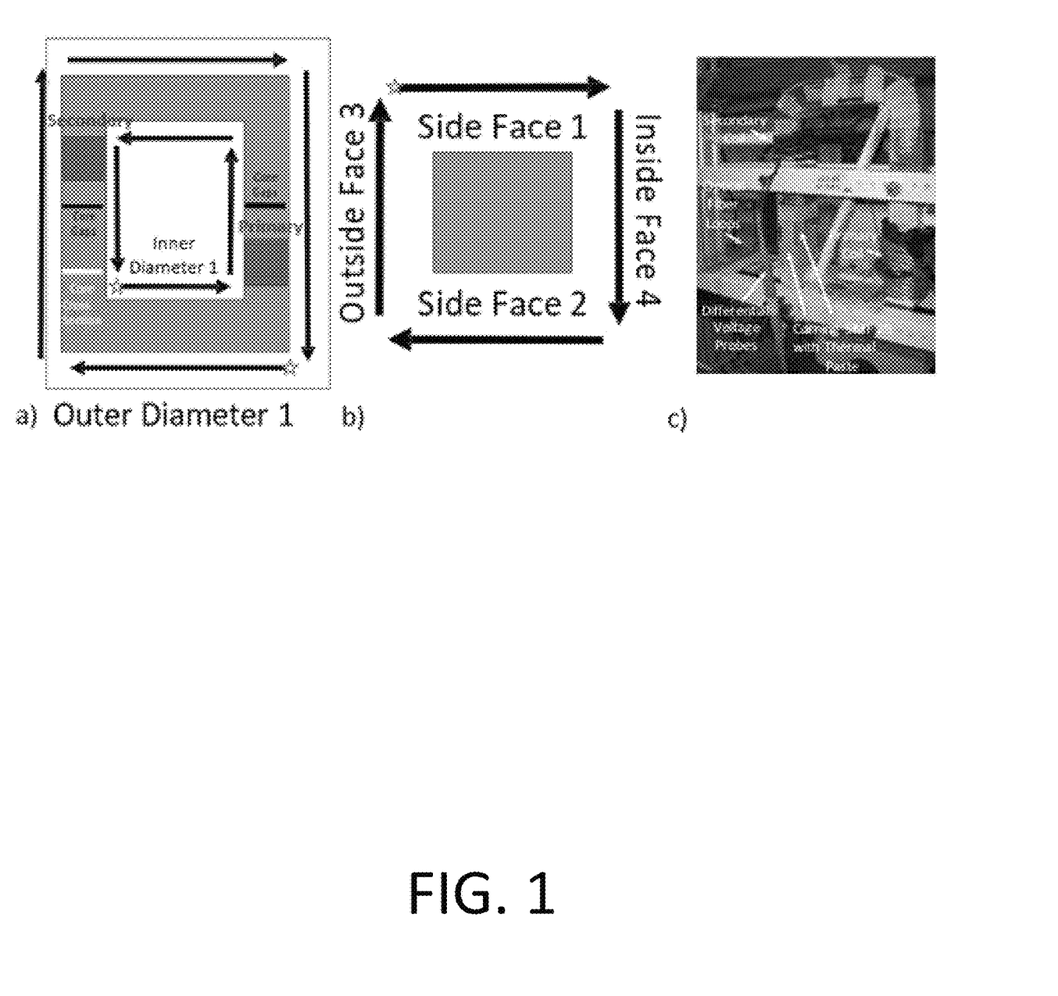
FIG. 1 shows a schematic of instrumented fibers along the core of the transformer in various configurations.

Three primary paths along the core were instrumented using the optical fiber to gain information about the temperature gradient along the outside of the core cross section as well as the inner diameter and outer diameter of the overall core. FIG. 1 shows a schematic of the three paths, illustrated by the black arrows in FIGS. 1(a) and 1(b), along with an image of the instrumented core in FIG. 1(c). These paths were chosen due to their importance and relevance during actual core operation including heat transfer of losses from the core interior to the surface and the surrounding environment as well as the spatial variation in the flux density distribution throughout the magnetic core resulting in a spatial variation in losses and associated temperature rise. FIG. 1(a) shows a schematic of a magnetic core showing primary and secondary coils, the core gaps, and the three instrumented paths of the fiber optic sensor including the inner diameter, outer diameter, and core cross section. FIG. 1(b) shows a cross section of the core illustrated in more detail showing the four faces of the core that were instrumented. The instrumented fiber begins at the "starred" region for each instrumented path and follows the ordered number with fiber loops at the sharp corners. Preferably, strain relief loops were placed on each corner of the core to ensure that there is no significant strain on the fiber during operation to minimize cross-talk between strain and temperature.

Figure 2:
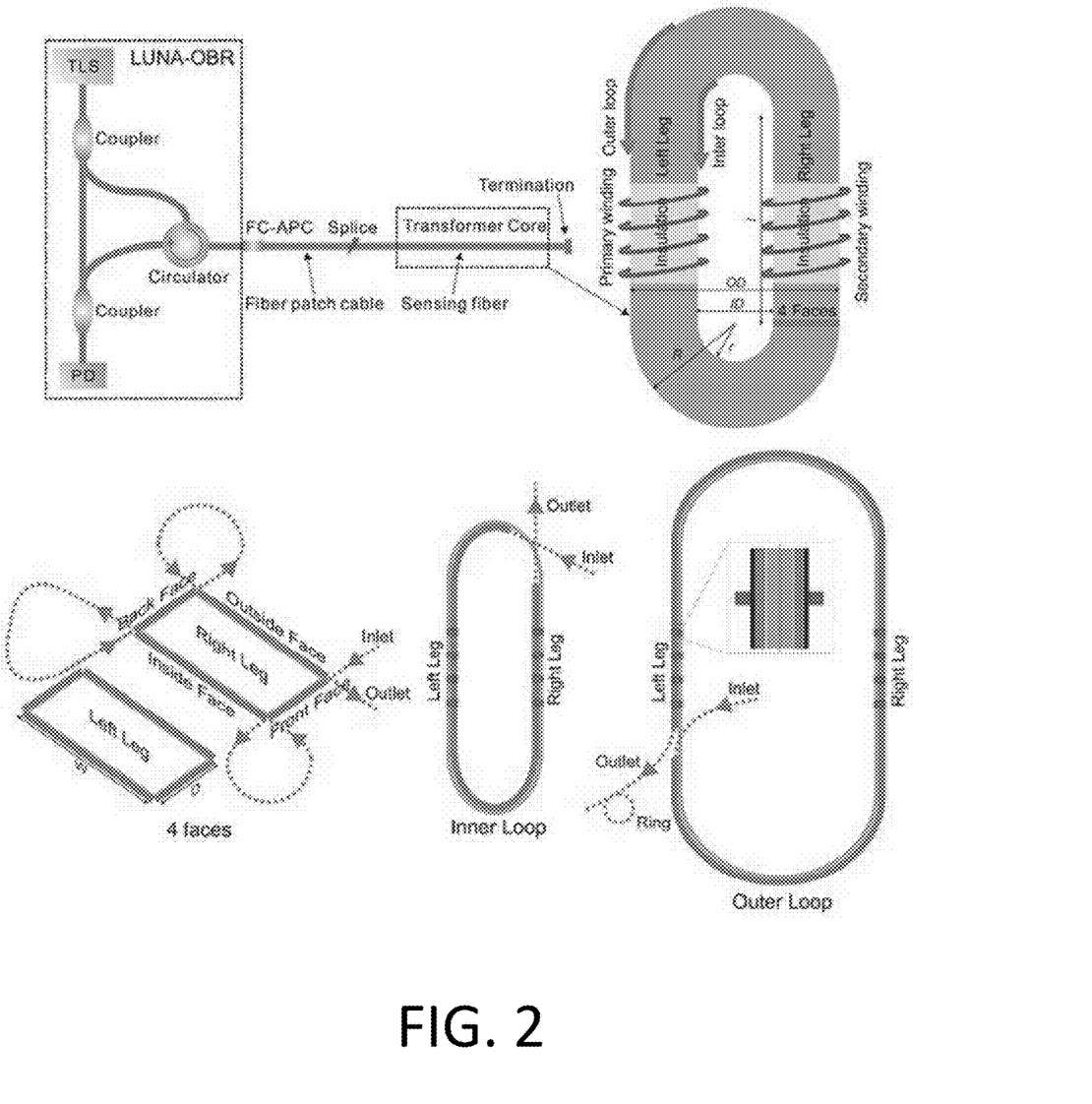
FIG. 2 is a schematic diagram of the configuration of the OFTD our system showing the design of the optical path of the instrumented optical fiber.

FIG. 2 illustrates a schematic diagram of the configuration of the OFDR system, the physical structure of the transformer core, and the design of the optical path. The OFDR system consists of a wavelength tunable laser source (TLS), a main interferometer, photodetectors (PD) and a sensing data acquisition and processing system. The sensing fiber is a 5 m long commercial SMF28 single-mode fiber fusion spliced with a single-mode fiber patch cable terminated with a FC/APC connector, and the rear end of the sensing fiber was coiled into a fiber ring of a very small diameter to prevent end-face Fresnel reflection. The sensing fiber is successively mounted on the four faces (front, inside, back left leg, back right leg, and outside), inner loop, and outer loop of the racetrack-core transformer which is defined by its inner and outer diameters, inner and outer radius, straight leg length, thickness and width.

In OFDR, a fast Fourier transform is performed to obtain the power spectrum of reflected light at different Rayleigh scattering points by converting the data from frequency-domain to time-domain. To realize distributed measurement of temperature, a reference trace is required for relative phase change measurement under two temperature conditions at each location along the fiber under test. Segments of the Rayleigh backscatter pattern at the same positions are extracted from both the reference and the measurement profiles and then transformed back to frequency-domain by using inverse fast Fourier transform. A Rayleigh backscattering spectrum as a function of spectral shift can be obtained accordingly. Thus, the cross-correlation between the Rayleigh backscatter spectra of the reference and measurement segments presents a spectral shift which is proportional to the changes in temperature. Distributed temperature sensing can be finally achieved by calibrating the spectral shifts.

Figure 3:
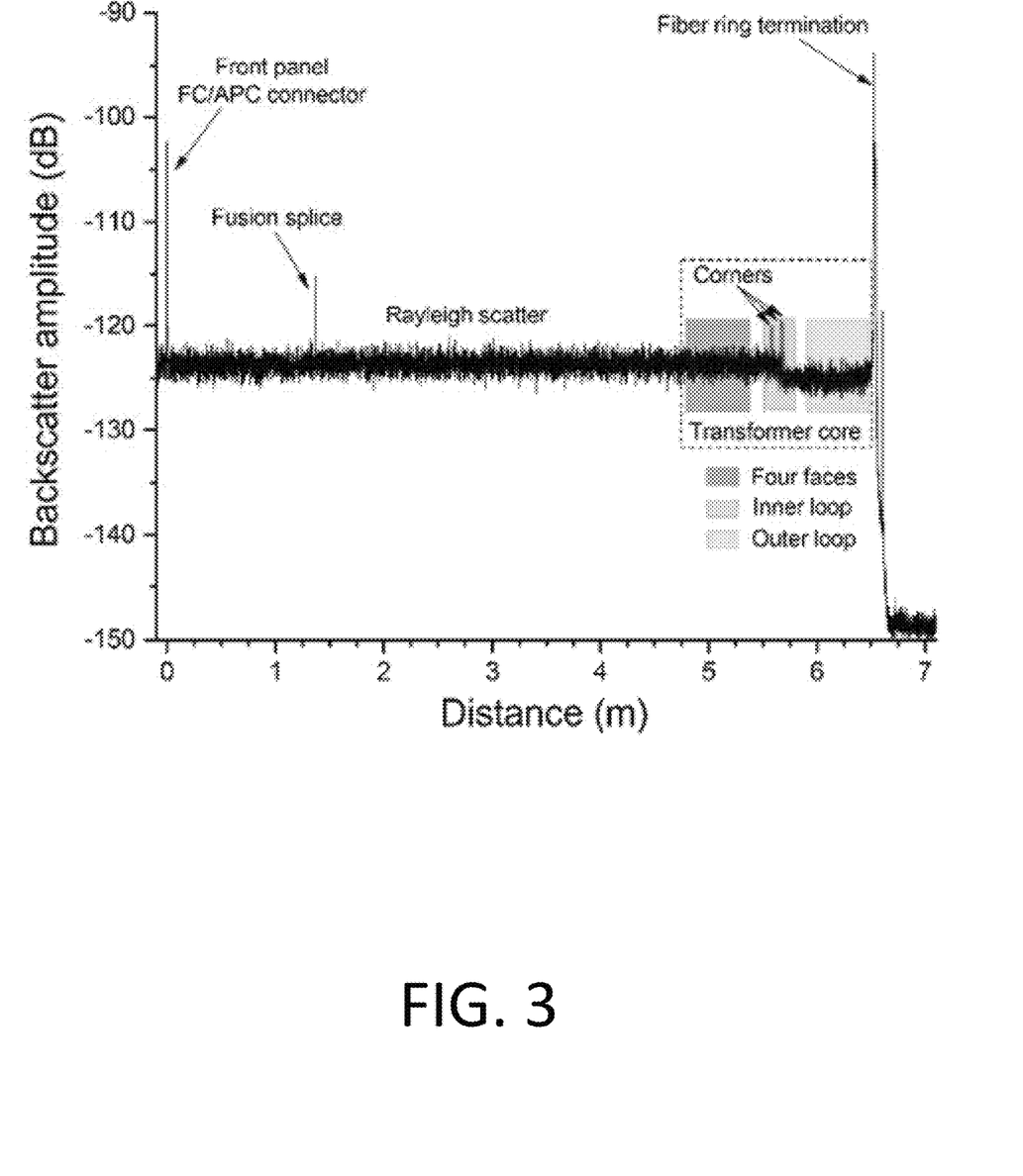
FIG. 3 is a graph showing reference backscatter signals versus distance along the sensing fiber instrumented on a transformer core.

The spatial resolution for an 85.5 nm laser sweep range is calculated to be 0.01 mm, while the sensor gauge length is selected to be 5 mm for cross-correlation based spectral shift calculation. A reference optical time-domain like trace is shown in FIG. 3, where the FC/APC connector at the front panel of the optical backscattering reflectometer, the fusion splicing point, Rayleigh backscattering in the sensing fiber are observable. It is noted that about 1.5 dB loss is caused by the sharp bend of the sensing fiber at the corners of the inner loop and no extra loss is found at the outer loop corner position because of a much larger bending radius. The transformer generates energy loss that is converted to heat once the transformer is in operation because of various sources of core loss including hysteresis, eddy current, and anomalous eddy current losses as well as losses within the primary and secondary windings. For well-designed transformers, the temperature eventually approaches a steady state value which varies spatially throughout the core and depends upon the details of (1) thermal management, (2) excitation conditions, and (3) core geometry, amongst others. The temperature rise of the transformer impacting the sensing fiber at different positions will be recorded by calibrating the thermally-induced spectral shift, while the temperature of the portion of the sensing fiber that is not attached to the transformer core is maintained at room temperature.

Figure 4:
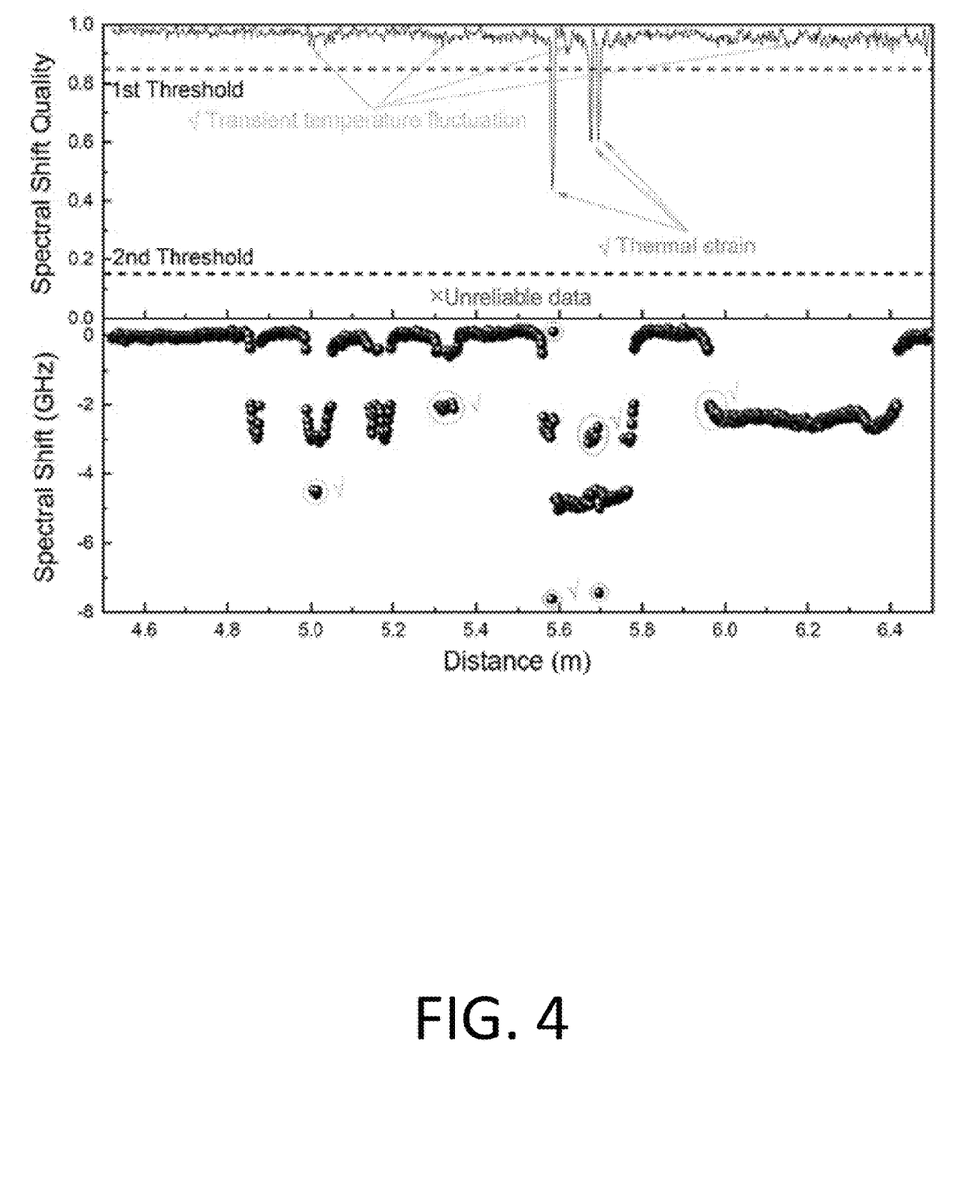
FIG. 4 shows the spectral shift of cross-correlation calculation between reference and measured Rayleigh spectra along the sensing fiber after 2 minutes of heating of a transformer core.
Figure 5:
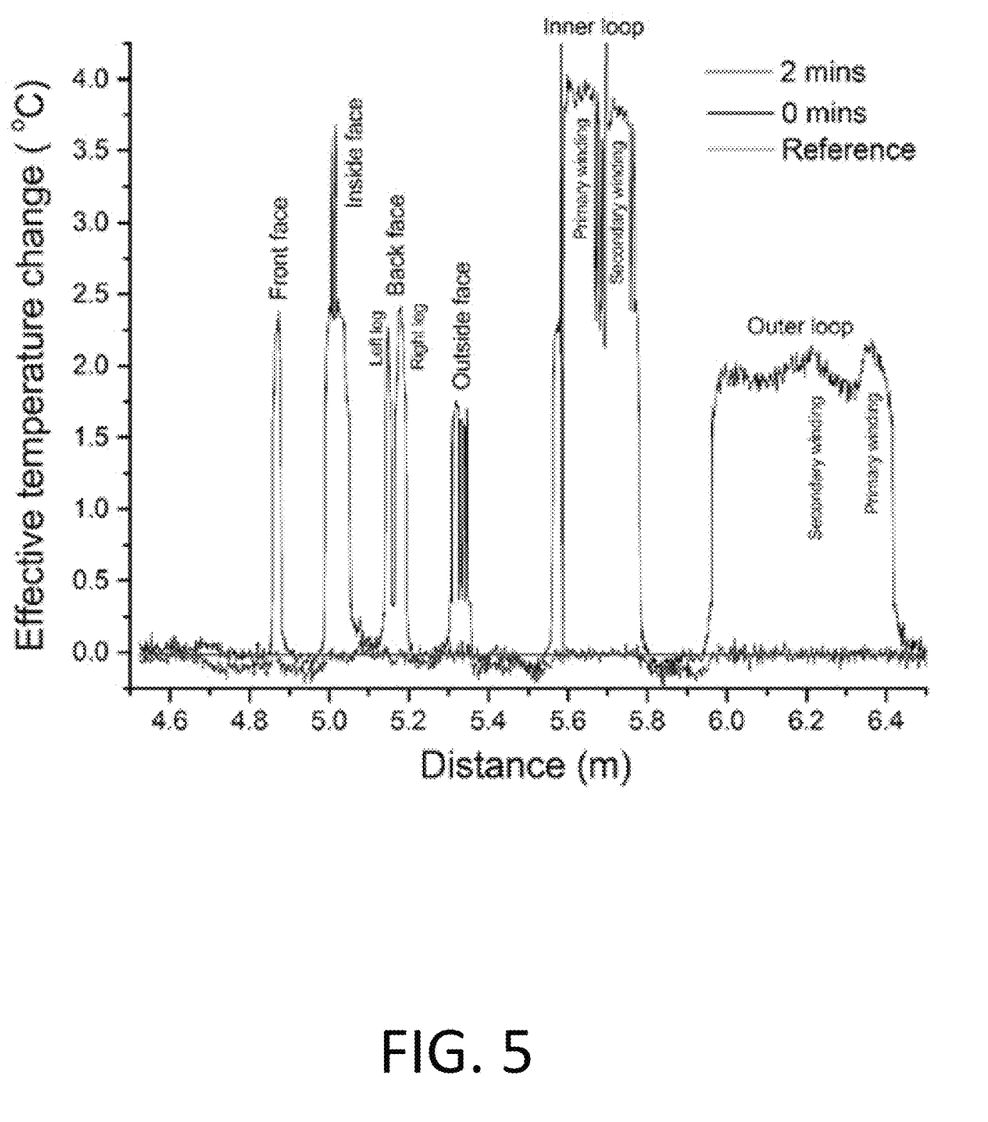
FIG. 5 shows the heating profile along the sensing fiber via reference spectra autocorrelation calculation after 0 and 2 minutes of heating of the transformer core.
Figure 6:
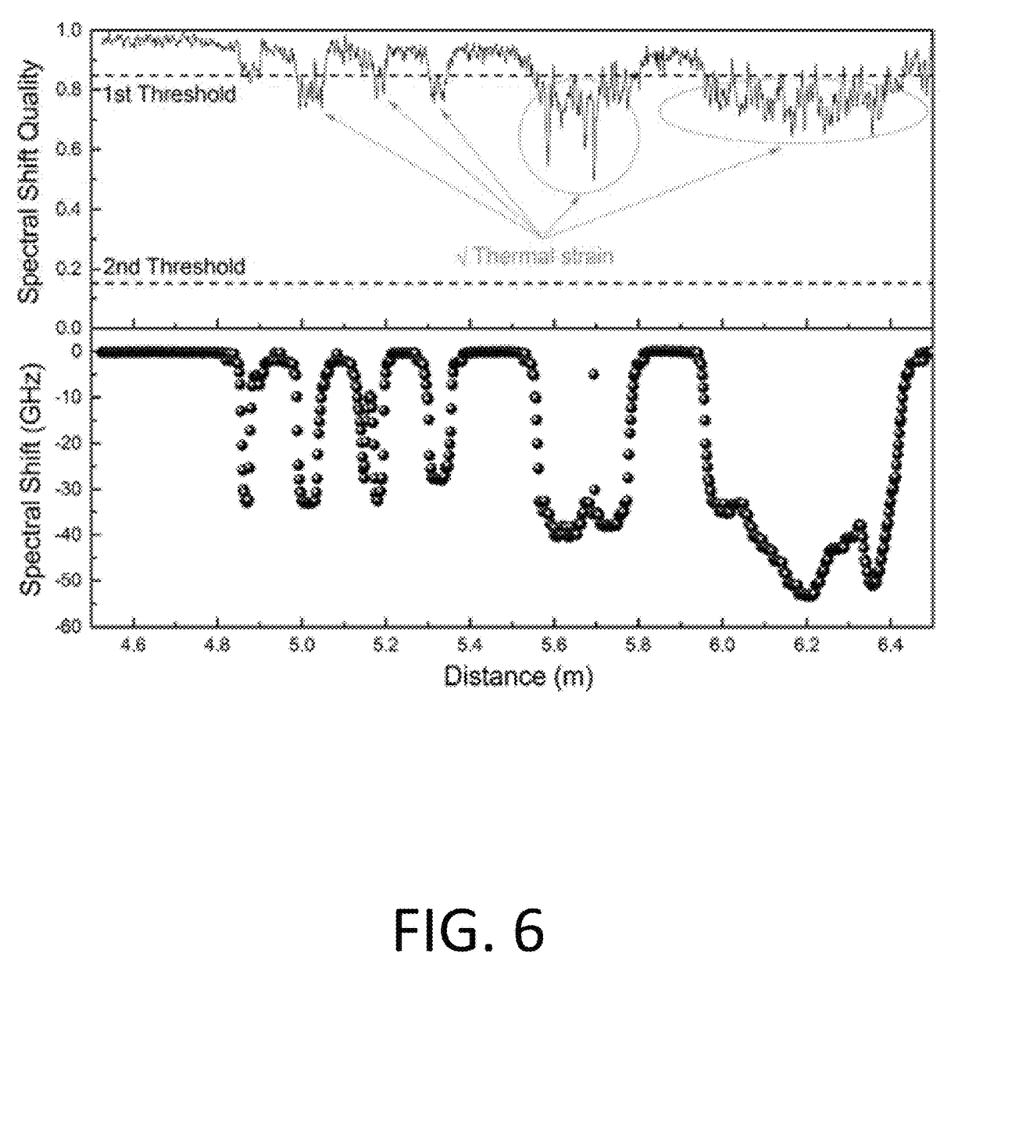
FIG. 6 shows the spectral shift of cross-correlation calculation between the reference and measured Rayleigh spectra along the sensing fiber after 28 minutes of heating of the transformer core.
Figure 7:
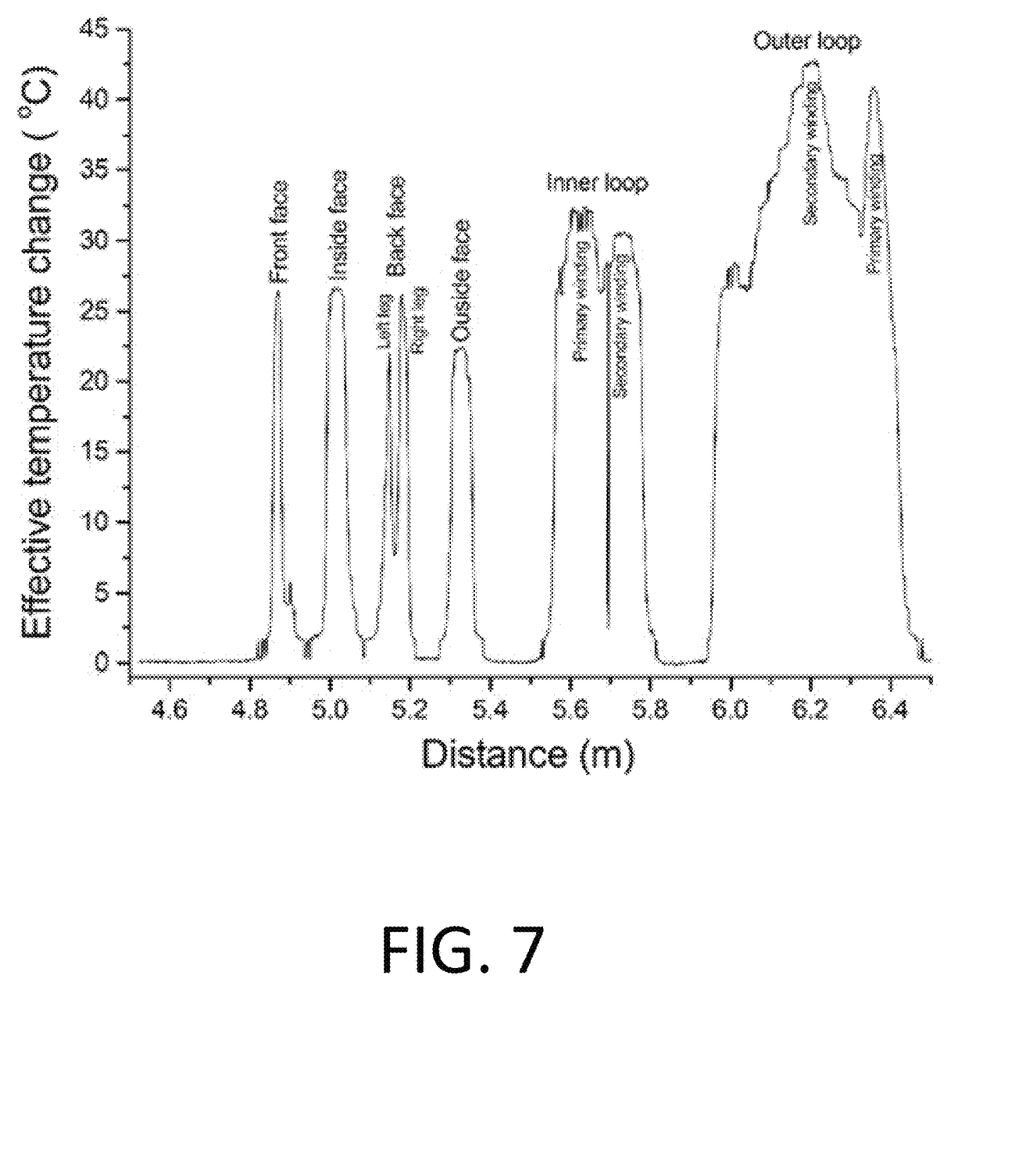
FIG. 7 shows the heating profile along the sensing fiber after 28 minutes of heating of the transformer core.

Another Rayleigh spectra is obtained when the transformer is in operation with the parameters of transformer operating conditions described in the previous section of experimental details. FIG. 4 shows the spectral shift of cross-correlation calculation between the reference and measurement Rayleigh spectra along the sensing fiber after 2 minutes of heating from the transformer core. FIG. 5 shows the reference heating profile along the sensing fiber via reference spectra autocorrelation calculation after 0 and 2 minutes of heating of the transformer core. FIG. 6 shows the spectral shift of cross-correlation calculation between the reference and test Rayleigh spectra along the sensing fiber after 28 minutes of heating of the transformer core, and FIG. 7 shows the heating profile along the sensing fiber after 28 minutes of heating of the transformer core.

Spectral shift quality, Q, as a measure of the correlation strength between the reference and measurement spectra is also evaluated by setting two thresholds which are Q=0.85 and Q=0.15, respectively. In the first region above the first threshold (0.85<Q<1), fast temperature variation occurs as the transformer is in operation. The region between the two thresholds (0.15<Q<0.85) indicates that thermal strain is induced onto the sensing fiber particularly at the inner loop corners where the optical fiber is sharply bent. The third region (0<Q<0.15) leads to invalid spectral shift quality values and fails the correlation algorithms causing unreliable spectral shift data. It is worth mentioning that erroneous spectral shift data at any specific location would not affect the validity of other sending data considering the working principal of OFDR.

As a demonstration of the capability for distributed core temperature measurements during actual operation, a reference was first taken at room temperature for the instrumented core to establish the baseline for subsequent experimental efforts. The core primary was then excited at an excitation of 100V and 50 kHz, using a 50% duty cycle square wave.

Figure 8:
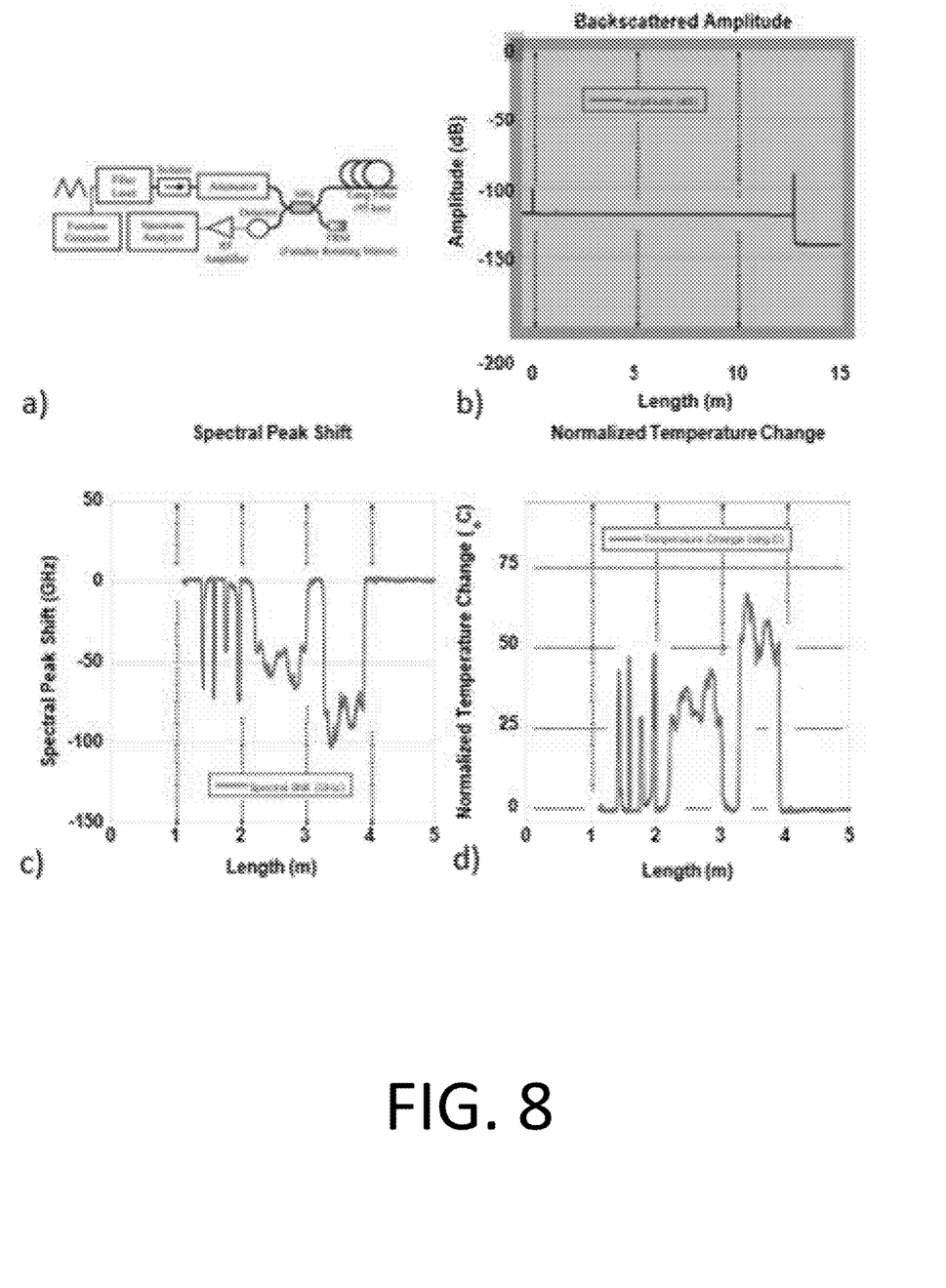
FIG. 8 shows an example method for performing optical frequency time domain reflectometry to determine local spectral shifts which are assigned to effective temperature changes locally.
Figure 9:
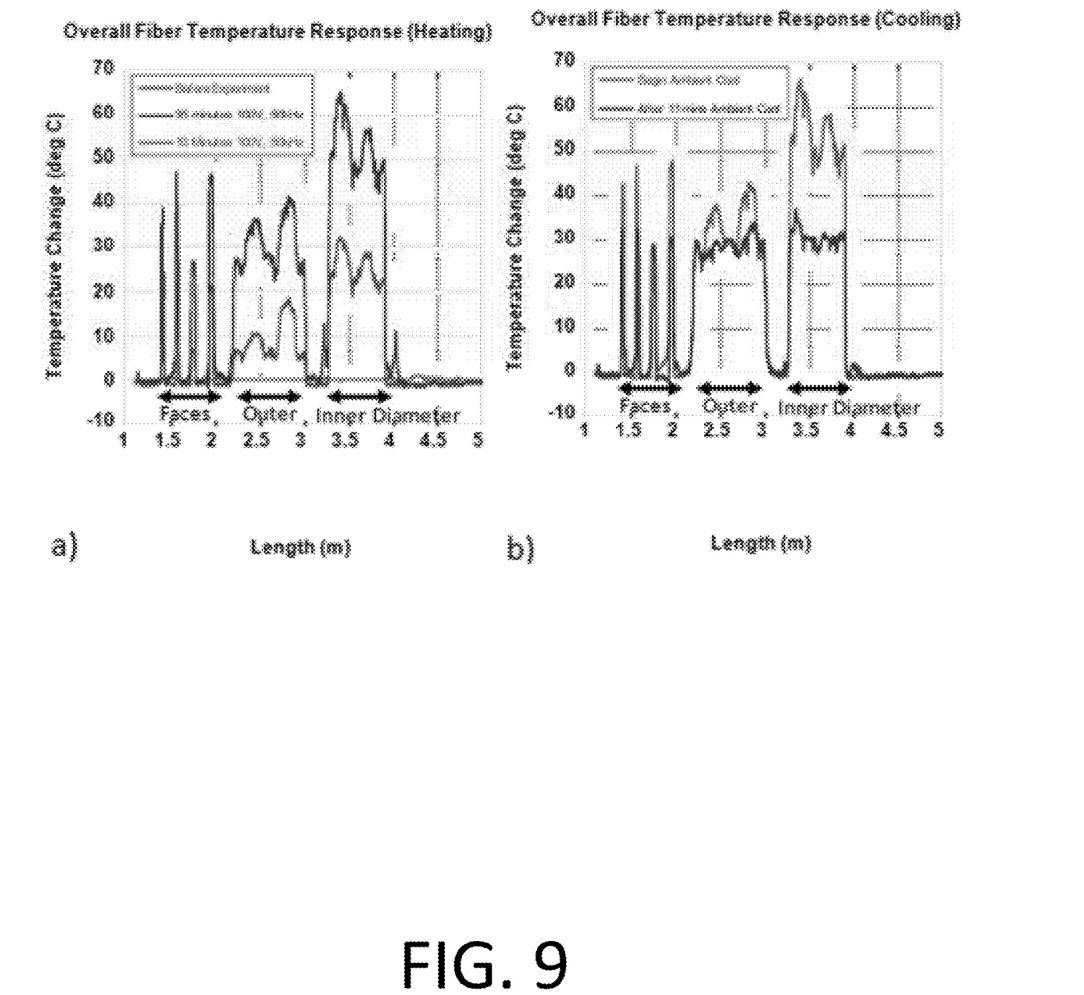
FIG. 9 shows core temperature profiles resulting from the active excitation transformer core and the subsequent cooling thereof.

The temperature rise with time was monitored as a function of spatial position along the core during operation using the instrumented fiber optic sensor. A total of 5 m of fiber sensor was interrogated during the proof-of-concept using a wavelength scan range of 1559-1582 nm, a sensor resolution of 0.1 mm, a gauge length of 0.5 mm, and a sensor spacing of 0.1 cm. The principle of the optical backscattering interferometry technique used to estimate the local temperature along the fiber is illustrated schematically in FIG. 8($a$). FIG. 8($b$) shows representative data of backscattered amplitude as a function of distance along the fiber. FIG. 8($c$) shows the estimated spectral peak shift and FIG. 8($d$) shows the associated normalized temperature change. The regions of zero normalized temperature change are associated with regions of the fiber that are not in direct thermal contact with the instrumented core, including the looped region between each end-face of the fiber for the cross-section path of FIG. 1($b$) to ensure no significant straining of the fiber during heating, In FIGS. 8($a$) and 8($b$), the regions of elevated temperature along the fiber are labeled corresponding to the region of the core in which they represent, namely the cross-sectional area faces, as shown in FIG. 1($b$) or the inner and outer core diameters, as shown in FIG. 1($a$). In FIG. 9($a$), the core is observed to heat with time because of the active primary excitation, while in FIG. 9($b$), the excitation has been turned off and the core is cooling under ambient conditions. Within a given region of the core, it is clear that there are significant variations in temperature along the surface of the core by as much as approximately 20° C. Hot spots on the core surface inner and outer diameters are likely to result from the presence of the primary and secondary windings as well as the core gaps and the inner bends in the core geometry. It can also be observed that the inner diameter of the core is at a correspondingly larger temperature than the outer core diameter. In fact, the overall temperature profile throughout the core can be illustrated more clearly by taking a closer look at selected regions of temperature profiles corresponding to individual core faces/diameters.

Figure 10:
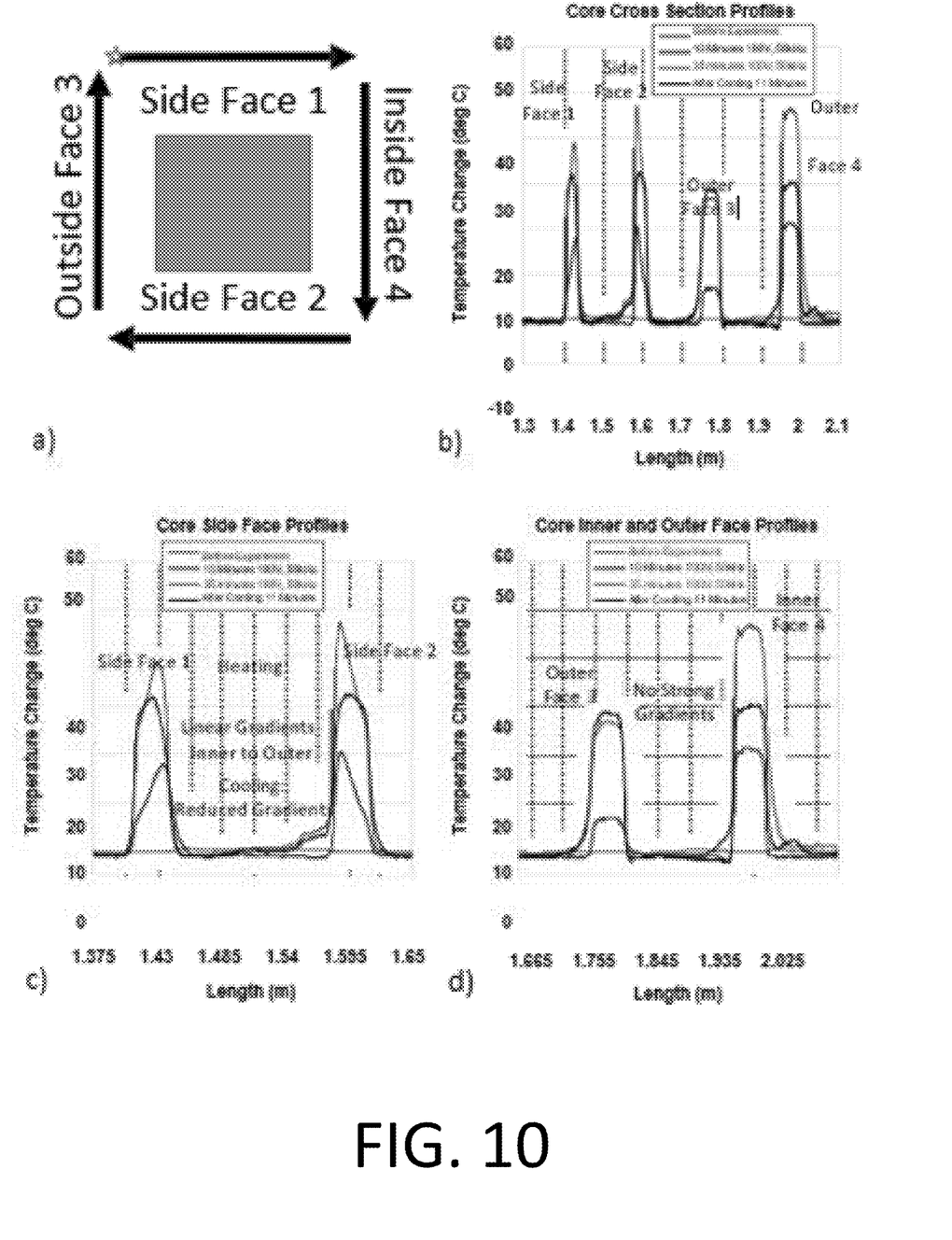
FIG. 10 shows localized core temperature profiles for various faces of the transformer core.

FIG. 10 shows the core temperature profiles. FIG. 10($a$) the cross-sectional face profiles are illustrated. In FIG. 10($b$), the overall profiles are illustrated for all four faces with a zero temperature change between faces corresponding to the fiber loops for strain relief which are not in contact with the core surface. A few key illustrations can be made based upon the obtained data: (1) the side faces demonstrate a linear gradient in temperature profile from the inner to outer core diameter, (2) the inner and outer faces do not show a linear gradient and instead appear to show a peak near the middle of the core face, and (3) the inner face is at a significantly higher temperature than the outer face.

These trends are illustrated more clearly in the data presented for each of the types of faces in FIGS. 9($c$) and 9($d$). In FIG. 9($c$), the temperature rise of the core side faces can be clearly resolved with increasing time of primary excitation with the linear gradient from inner to outer surface noted above. Upon removal of the excitation voltage/current, a cooling is observed and, in particular, the linear gradient between the core inner and outer diameters becomes dramatically reduced. For the inner and outer faces presented in FIG. 10(d), the lack of strong gradient across the face is clearly observed with the core inner face being significantly higher than the outer face during the core excitation. After cooling due to removal of the active excitation, the temperatures of the inner and outer faces quickly begin to approach one another, which is consistent with the reduced gradient observed on the side faces. A significant gradient in core temperature between inner and outer faces is expected due to the increased flux concentration at the inner diameter of the core relative to the outer diameter. In addition, the well-established anisotropic thermal conductivity of cores in this class of materials can also enhance the gradient in temperature due to a much larger effective thermal conductivity in the plane of the laminated tape wound cores as compared to the normal direction to the laminations.

Figure 11:
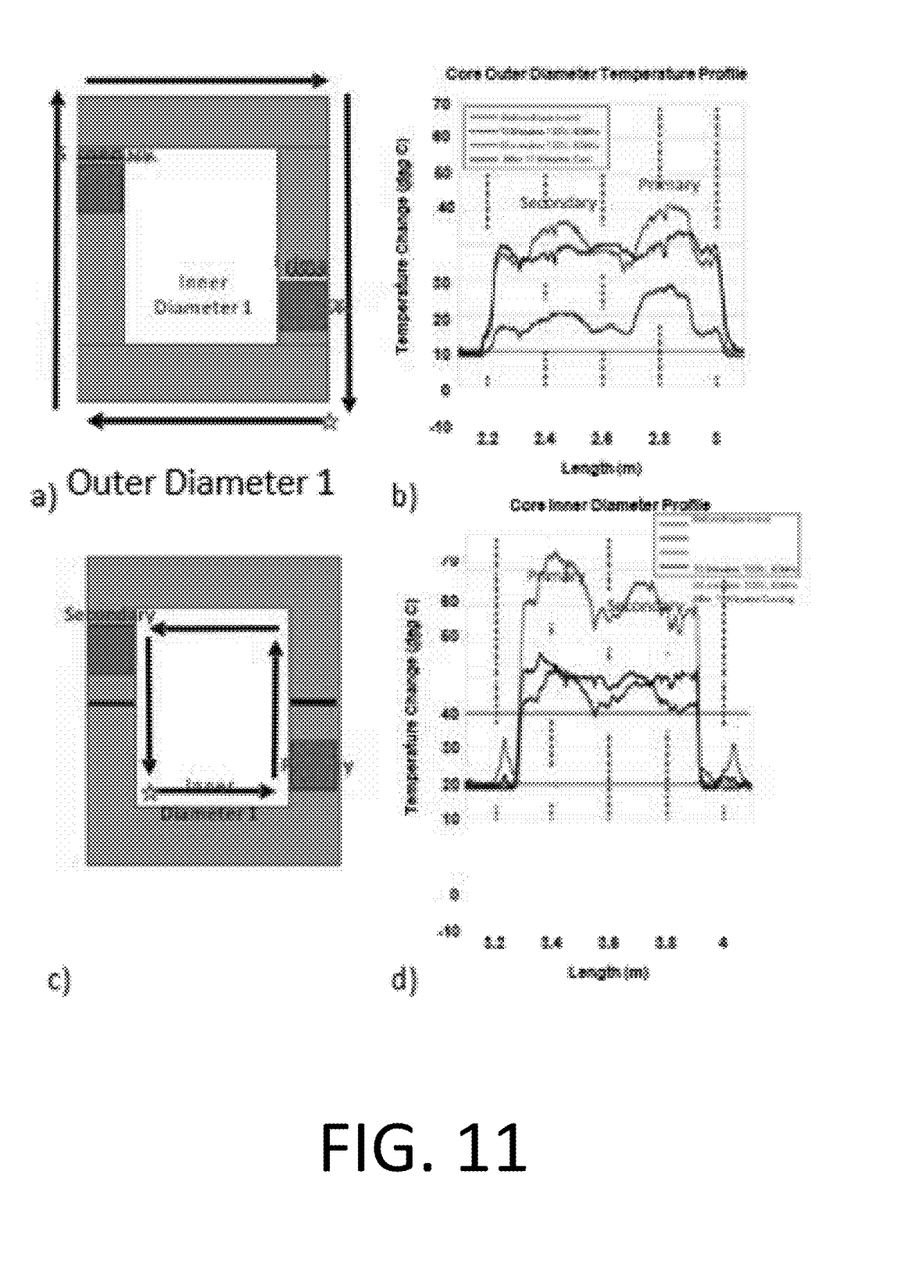
FIG. 11 shows core temperature profiles for the outer and inner diameters of the transformer core.

FIG. 11(b) shows the core temperature profile for the outer diameter, shown schematically in FIG. 11(a). FIG. 11(d) shows the core temperature profile for the inner diameter, shown schematically in FIG. 11(c). The results are generated by a 100V, 50 kHz, 50% duty cycle square wave excitation for 35 minutes and after removal of the excitation for 11 minutes resulting in core cooling. Consistent with the results of FIG. 9, the inner core diameter is consistently at a higher temperature than the outer core diameter during the active core excitation from the primary side. In addition, an oscillation of surface temperature can be observed with two primary, broad peaks appearing to be the most prominent features for both the inner and outer core diameters. One of the two peaks appears to be consistently larger than the other, and both peaks are associated with the primary and secondary winding locations on the core with the larger peak being associated with the primary winding. It is interesting to note that upon removal of the active excitation, the thermal gradient along the outer and inner diameter surfaces as well as the temperature differential between the surfaces are significantly reduced as compared to the case in which the excitation is active. Such observations are fully expected due to the details of the magnetic flux excitation as a function of spatial position and excitation details with localized heating within a given core geometry.

In other embodiments, a chemically sensitive coating may be applied to the outside of the cladded fiber to locally strain the optical fiber in response to various chemical species of interest. These could include, for example, $H_2$, CO, acetylene, $CH_4$, $CO_2$, $O_2$, $SF_6$, and any others. In another embodiment, the chemically sensitive coating could be applied to an unclad fiber or to a fiber having the cladding modified and/or removed to result in a significant change in local absorbance or scattering by the fiber in response to chemical species of interest. Example functional layers could include oxides, metals such as Pd, metallic/oxide based nanocomposites such as Pd incorporated oxides, organics, metalorganic frameworks and inorganic/organic hybrids.

In yet another embodiment a magnetic field sensitive, magnetostrictive coating may be applied to the cladded fiber, resulting in local straining of the fiber in response to the presence of magnetic fields. In yet other embodiments, a magnetic field sensitive or optically responsive coating could be applied to a cladded, unclad it, or a cladding modified and/or cladding removed optical fiber which is a significant response in optical properties to applied magnetic fields resulting in a change in local absorbance or scattering by the optical fiber. Example functional layers could include FeCo-alloys, TbFeDy-alloys, NiFe-alloys, and any other metallic or non-metallic material with a significant strain response to applied magnetic fields (magnetostrictive coatings). Example functional layers could also include perovskites and other correlated electron based oxides with strong magnetic field dependent electronic conductivities such as (La,Sr)MnO3, (La,Sr)(Co,Fe)O3, LaTiO3 and any other materials with significant magnetic field dependent electronic transport behavior (GMR, TMR, etc.)

In yet other embodiments, an electric field sensitive, electrostrictive/piezoelectric coating may be applied to the cladded fiber resulting in local straining of the fiber in response to the presence of local electric fields. In yet other embodiments an electric field sensitive, optically responsive coating may be applied to a cladded, unclouded, or cladding modified and/or cladding removed optical fiber which has a significant response in optical properties to applied electric fields, resulting in a change in the local absorbance or scattering by the optical fiber. Example functional layers could include LiNbO3, quartz, langasite, PZT, and any other metallic or non-metallic material with a significant strain response to applied electric fields (electrostrictive/piezoelectric coatings). Example functional layers could also include oxides or polymers with strong electric field dependent electronic conductivities and any other materials with significant electric field dependent electronic transport behavior Example functional layers could include electro-optical materials.

The novel technique of the present application is, amongst other applications, capable of being used to aid in the identification of local hot spots during the operation of a core which might otherwise result in thermal runaway and failure of the component. Although the concept is demonstrated on a prototype core in a laboratory setting, prevention of thermal runaway and failures for large power transformers and other significant electrical power assets (inductors, motors, etc.) can yield significant economic and social benefits.

We claim:

1. A method of temperature measurement comprising:
    instrumenting a transformer by placing an optical fiber in thermal contact with one or more portions of a core of the transformer;
    energizing the transformer by applying a voltage thereto;
    obtaining a temperature measurement at a plurality of measurement points along the optical fiber based on Rayleigh backscattering;
    creating, based on the obtained temperature measurements, a continuous, spatially-resolved distribution of internal temperatures of the transformer; and
    identifying one or more hot spots among the plurality of measurement points, the one or more hot spots indicative of a potential thermal failure of the transformer.

2. The method of claim 1 further comprising mapping a 2d or 3d temperature profile of the transformer.

3. The method of claim 2 further comprising comparing the 2d or 3d temperature profiles with thermal models of the transformer to predict the thermal failure of the transformer.

4. The method of claim 1 wherein thermal contact between the optical fiber and the core of the transformer is maintained using a thermal paste.

5. The method of claim 1 wherein the instrumentation comprises placing the optical fiber along the outer and inner diameters of the core of the transformer.

6. The method of claim 5 wherein the instrumentation further comprises placing the optical fiber between laminations of the transformer core.

7. The method of claim 6 wherein the instrumentation further comprises creating loops of the optical fiber at corners of the transformer core to prevent strain on the optical fiber.

8. A method of strain measurement comprising:
instrumenting one or more internal portions of a power magnetics component by placing an optical fiber in mechanical contact with the one or more internal portions, the optical fiber being modified with a chemically-sensitive coating such that the physical properties of the optical fiber are altered by locally straining the optical fiber in response to various chemical species;
energizing the power magnetics component by applying a voltage thereto;
interrogating the optical fiber when the power magnetics component is energized using Rayleigh backscattering; and
creating, based on the interrogation, a continuous, spatially-resolved distribution of strain within the power magnetics component.

9. The method of claim 8 wherein the coating is applied as cladding to the optical fiber or is in optical communication with a core of the optical fiber when the cladding of the optical fiber has been removed or modified.

10. The method of claim 9 wherein the coating is selected from a group comprising oxides, metals, metallic or oxide-based nanocomposites, organics, metalorganic frameworks and inorganic or organic hybrids.

11. The method of claim 8 where the strain is measured dynamically such that a spatially-resolved acoustic signal can be measured.

12. A method of measuring a magnetic or electric field of a power magnetics component comprising:
instrumenting one or more internal portions of the power magnetics component by placing an optical fiber in physical contact with the one or more internal portions, the optical fiber being coated with a material selected from a magnetoresistive group comprising perovskites, (La,Sr)MnO3, (La,Sr)(Co,Fe)O3, LaTiO3, magneto-optical materials, and electro-optical materials;
energizing the power magnetics component by applying a voltage thereto;
interrogating the optical fiber when the power magnetics component is energized by detecting changes in intensity and/or polarization of Rayleigh backscattering in the optical fiber;
determining changes in the magnetic or electric field based on the detected changes in the intensity and/or polarization of the Rayleigh backscattering; and
identifying changes in the magnetic or electric field indicative of a potential failure of the power magnetics component;
wherein the changes in the magnetic or electric field of the power magnetics component alter the optical properties of the optical fiber as a result of the coating of the optical fiber.

13. The method of claim 12 further comprising:
creating a continuous, spatially-resolved distribution of the magnetic or electric field in the interior of the power magnetics component.

14. The method of claim 13 wherein the power magnetics component is a transformer and further wherein the instrumentation comprises placing the optical fiber along the outer and inner diameters of a core of the transformer.

15. The method of claim 12 further comprising using the detected change in the magnetic or electric field to optimize operation of the power magnetics component.

16. The method of claim 12 wherein the coating alters the optical properties of the optical fiber in response to changes in the magnetic or electric field of the power magnetics component.

17. The method of claim 16 wherein the coating is applied as cladding to the optical fiber or is in optical communication with the core of the optical fiber when the cladding of the optical fiber has been removed or modified.

* * * * *